H. D. PALMER.
SPRING HANGER.
APPLICATION FILED DEC. 29, 1920.
1,414,748.
Patented May 2, 1922.
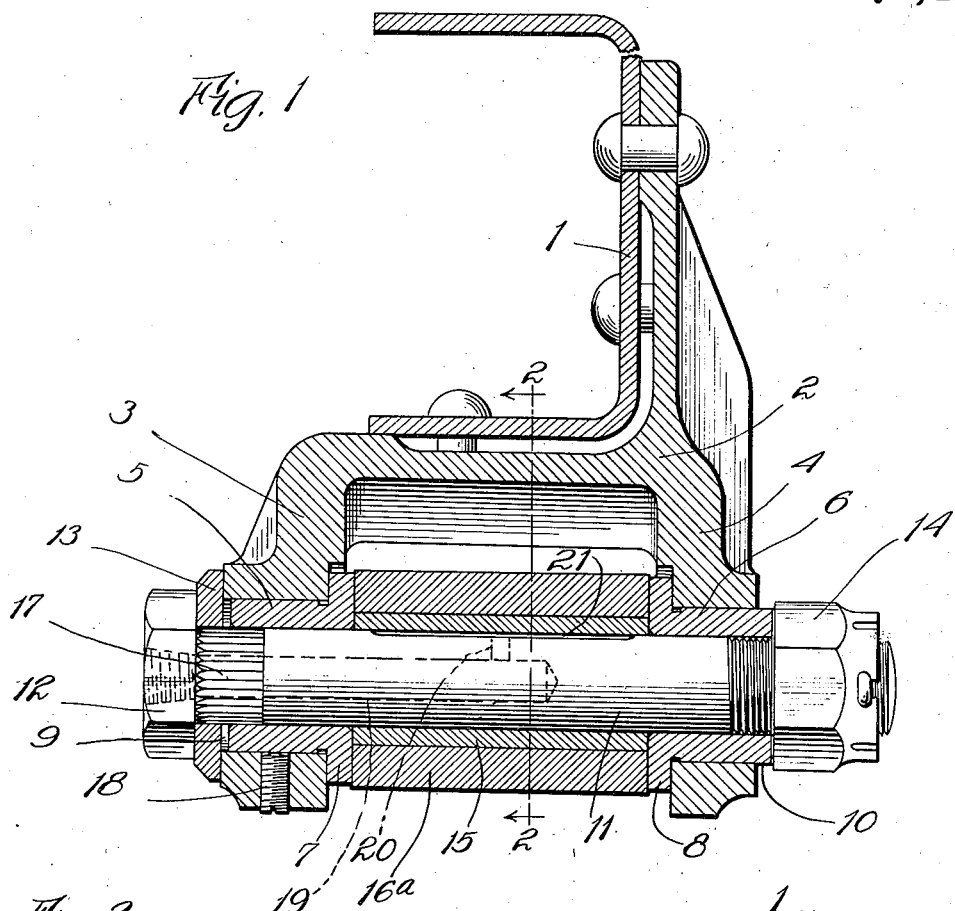
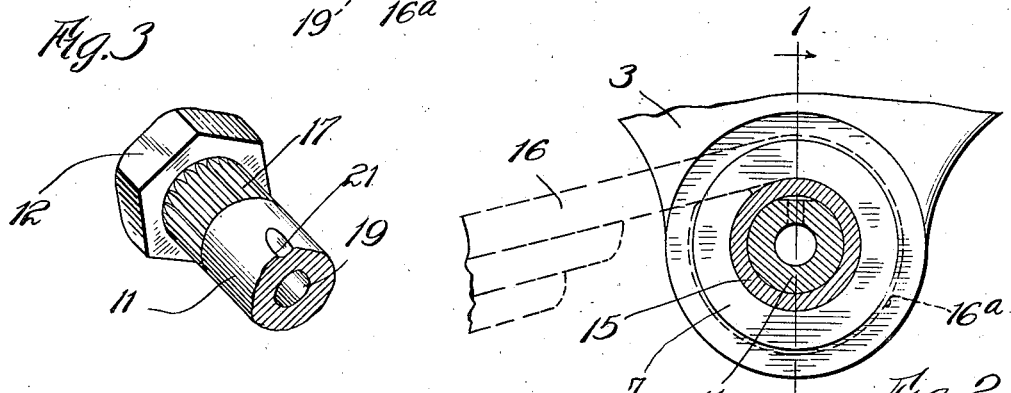
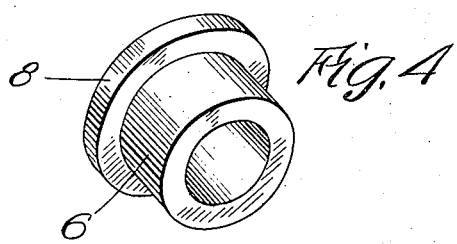
Inventor
Herman D. Palmer
By Miller Chindohl Parker
Attys

UNITED STATES PATENT OFFICE.

HERMAN D. PALMER, OF HARTFORD, WISCONSIN, ASSIGNOR TO KISSEL MOTOR CAR COMPANY, A CORPORATION OF WISCONSIN.

SPRING HANGER.

1,414,748.  Specification of Letters Patent.  Patented May 2, 1922.

Application filed December 29, 1920. Serial No. 433,954.

*To all whom it may concern:*

Be it known that I, HERMAN D. PALMER, a citizen of Germany, having declared my intention of becoming a citizen of the United States, residing at Hartford, in the county of Washington and State of Wisconsin, have invented certain new and useful Improvements in Spring Hangers, of which the following is a specification.

The invention relates to spring connections for vehicles.

The object of the invention is to provide a spring connection wherein side play between a spring and the adjacent members of its support may be prevented, thereby eliminating noise and excessive wear.

The usual construction of the connection by which a vehicle body is suspended on springs includes a hanger carried by the frame of the vehicle and in which the end of the spring is supported. A loop or eye formed on the end of the spring engages a bolt carried by the hanger. The spring being constructed of material much harder than that ordinarily used in the hanger, the ordinary oscillations of the spring in the operation of the vehicle, cause it to wear away the surfaces of the hanger adjacent to the sides of the spring eye. After a comparatively short period, a considerable clearance develops between the spring and the hanger, resulting in side play and objectionable noise.

It is the particular object of this invention to provide simple, durable and easily adjusted means for taking up any clearance which develops between the spring eye and its side bearing members and thereby prevent appreciable side play. I have attained these objects by constructing a connection having longitudinally adjustable bushings carried on the spring bolt, and which are adapted to be maintained in snug bearing contact with the sides of the spring, independently of the relative lateral space between the supporting arms of the hanger. Other objects and advantages of the invention will be apparent in the course of the following description.

I have described and illustrated herein a preferred embodiment of my invention as adapted to a hanger for supporting the front end of a rear spring in an automobile. I desire it to be understood however that my invention may be adapted to any construction of a hanger or shackle employing a pivoted connection for the support of a vehicle spring, without departing from the spirit of the invention.

In the drawings, Figure 1 represents a vertical section of a hanger and spring connection taken on the line 1—1 of Fig. 2. Fig. 2 is a fragmentary cross sectional view of the spring connection and bolt taken on the line 2—2 of Fig. 1, the spring with its looped bearing end being shown in broken lines. Fig. 3 is a fragmentary perspective view of the bolt on which the spring is supported and Fig. 4 is a perspective view of one of the bushings by which side clearance is taken up.

Referring to Fig. 1, the numeral 1 indicates a side member of an automobile frame on which is mounted a hanger bracket 2 having a pair of spaced depending arms 3 and 4 from which a spring is supported. The arms 3 and 4 are formed with transverse alined apertures adapted to receive with tight sliding fit a pair of bushings 5 and 6 having radial flanges 7 and 8 extending from the inner ends of the bushings and lying against the inner surfaces of the arms 3 and 4 respectively. The portion of the arm 3 supporting the bushing 5 is of sufficient thickness to extend a substantial distance beyond the outer end of the bushing as indicated at 9. The similar portion of the arm 4 is of narrower cross section, permitting the end of the bushing 6 to protrude a substantial distance beyond the outer face of the arm 4, as at 10.

A spring bolt 11 forming a pintle support for the spring, is carried by the bushings 5 and 6. The bolt extends through the bushings and is formed with a head 12 on the end supported by the arm 3. A washer 13, encircles the shank of the bolt adjacent to its head and abuts the outer surface of the arm 3, being spaced thereby from the outer end of the bushing 5. A nut 14 is carried on the end of the bolt which extends through the bushing 6, having screw-threaded engagement with the bolt and adapted to be locked against rotation thereon. I have illustrated herein the well known type of cottered nut, but obviously any of the common types of lock nut may be used. The nut 14 is provided with a plurality of pairs of diametrically opposite notches 14ᵃ in its outer end to receive the cotter pin 14ᵇ. The nut 14 may be turned into abutment with the outer end of the bushing 6 and locked in such relation.

A bearing sleeve 15 surrounds the bolt 11 between the inner faces of the bushing flanges 7 and 8, and is constructed of relatively soft metal suitable for bearing purposes. A vehicle spring 16 is supported on the bearing sleeve, having the end of one of its leaves curved about the sleeve in the form commonly known as a spring eye 16ᵃ, the sides of which are in contact with the inner faces of the bushing flanges 7 and 8.

It will now be apparent that upon the development of clearance between the sides of the spring eye and the abutting surfaces of the bushings, due to friction occurring with the oscillations of the spring in its hanger, the nut 14 may be turned against the protruding end of the bushing 6 to drive it through the arm 4 into bearing contact with the adjacent side of the spring eye 16ᵃ, and laterally force the latter into similar contact on its opposite side with the bushing 5. In this operation, the counterstrain is sustained by the screw threads of the bolt 11, the head 12, and washer 13, and transmitted to the outer surface of the arm 3, the inner surface of which receives the opposing thrust of the flange 7. It will thus be seen that there are no side strains set up nor adjustment required between the supporting arms 3 and 4, the bushing 6 moving away from the arm 4 with its inward adjustment and being sustained in position by the nut 14.

It is preferable to prevent rotation of the bolt and bushings within the hanger bearings, and to that end I have provided longitudinal serrations 17 around the shank of the spring bolt 11 adjacent to its head and extending inwardly a sufficient distance to engage the bushing 5. In assembling the connection, the bolt is forced into the bushing whereby the serrations grip the inner surface of the bushing and prevent relative rotation. A set screw 18, carried by the arm 3, engages the outer surface of the bushing 5 and prevents its rotation in the arm bearing. By this means the relative movement between the spring and its hanger support is limited to the oscillation of the bearing sleeve 15, and the latter being of softer material than the spring and bushings, its ends wear faster than the latter and consequently does not interfere with the proper lateral adjustment of the bushings to the spring eye.

To provide proper lubrication for the bearing surfaces between the bolt 11 and sleeve 15, the former may be bored axially as at 19 and adapted at its outer end to receive an oil cup (not shown) from which lubricant may be delivered through a port 20 to a longitudinal chamfer 21 formed in the bearing surface of the bolt.

As soon as any side play develops between the spring eye 16ᵃ and the hanger (usually after five hundred miles of operation), the cotter pin 14ᵇ is removed, the nut 14 turned to bring the next pair of notches 14ᵃ into register with the cotter pin opening in the bolt, and the cotter pin replaced. The adjustment of the nut causes the bushing 6 to advance toward the spring eye 16ᵃ, thus taking up the clearance caused by wear between the spring eye and the flanges 7 and 8. It has been found that the car-owner or chauffeur may thus very conveniently take up any looseness which may result from wear, while at the same time the construction is such that the user is not likely at any given time to attempt so much adjustment as to cause excessive pressure between the spring eye and the flanges 7 and 8.

It will now be apparent that I have provided simple, durable means associated with the spring bolt in a vehicle spring connection, by which side play between the spring and support, with its consequent objectionable results, may be effectively eliminated without imposing undue strain upon a rigid hanger, nor requiring adjustment in the spacing between the connecting side members carrying the bolt.

I claim as my invention:

1. A spring connection for vehicles comprising a hanger having a pair of supporting arms, a bushing supported in each of said arms, a bolt carried by said bushings and adapted to support a spring having a rocking seat thereon between said bushings, one of said bushings being adjustable longitudinally of said bolt to maintain constant bearing contact with the sides of said spring and the other bushing being non-rotatable with respect to said bolt.

2. In a spring connection, in combination, a bolt having a head and a screw-threaded nut on its respective ends and adapted to carry a spring end having rotatable engagement therewith, a pair of bushings mounted on said bolt, one of said bushings abutting one side of said spring and being non-rotatable on said bolt, and the other of said bushings abutting the opposite side of said spring and being limited in its longitudinal movement by said nut, and supports for the bushings.

3. A device for supporting vehicle leaf springs comprising a pair of spaced bearing members having axially alined bushings for receiving a bolt entered through the eye of the spring, said bushings being located on opposite sides of the spring eye, one of said bushings being adjustable longitudinally of the bolt into engagement with said spring eye, and the other one of said bushings being held against longitudinal movement in the adjustment of the first mentioned bushing.

4. In a spring connection, in combination, a hanger having spaced annular bearings, annular bushings carried in the bearings, means to prevent rotation of one of said bushings in its bearing, and a spring bolt extending through said bushings, said bolt having longitudinal serrations formed on a portion of its surface adapted to be embedded in the engaging surface of one of said bushings to prevent relative rotation therebetween.

5. In a spring connection, in combination, a support having a pair of spaced bearings, bushings supported in the bearings, one of said bushings being shorter than its said bearing and the other of said bushings extending through its said bearing and outwardly a substantial distance, a bolt extending through said bushings and having a head and a screw-threaded nut on its respective ends, and a spring supported on said bolt between said bushings.

6. In a spring connection, in combination with a leaf spring having its end forming an eye, a bearing sleeve supported in the eye, a bolt passing through said sleeve and having a head on one end and a nut on the other, a pair of bushings mounted on said bolt having radial flanges in bearing contact with opposite ends of said spring eye and sleeve, longitudinal serrations formed on said bolt adapted to engage one of said bushings in non-rotatable relation, a support having a bearing carrying one of said bushings, said bearing being of greater length than said bushing, and a second support having a bearing carrying the other of said bushings, the outer end of said latter bushing extending a substantial distance outwardly from its said bearing.

7. In a spring connection, in combination, a pair of supporting members, a bolt adapted to carry a spring positioned on its center portion and having a head and a screw-threaded nut on its respective ends, a pair of bushings mounted on said bolt and having radial flanges on their inner ends abutting said spring, said bushings being supported in bearings formed respectively in each of said supporting members and abutting said flanges oppositely to said spring, one of said bearings being of substantially greater length than its said bushing and the other bearing being of substantially less length than its associated bushing permitting the latter to extend outwardly therefrom, whereby upon the turning up of said nut on said bolt, the bushing adjacent to said nut is moved longitudinally of said bolt to effect snug bearing contact of the spring with both of said bushings.

8. A spring connection having, in combination, two alined bearings, a bushing secured in one of said bearings, a bushing slidable longitudinally in the other bearing, said bushings having integral flanges on their inner ends, a pintle extending through said bushings, an element pivoted on said pintle between said flanges, and means for moving the second-mentioned bushing toward the other bushing to take up wear between said element and said flanges.

In testimony whereof, I have hereunto set my hand.

HERMAN D. PALMER.